(12) United States Patent
Suh

(10) Patent No.: US 10,962,799 B2
(45) Date of Patent: Mar. 30, 2021

(54) EYEGLASS FRAME SUPPORTED BY CHEEK BONES

(71) Applicant: Young Woo Suh, Seoul (KR)

(72) Inventor: Young Woo Suh, Seoul (KR)

( * ) Notice: Subject to any disclaimer, the term of this patent is extended or adjusted under 35 U.S.C. 154(b) by 329 days.

(21) Appl. No.: 16/068,083

(22) PCT Filed: Mar. 3, 2016

(86) PCT No.: PCT/KR2016/002115
§ 371 (c)(1),
(2) Date: Jul. 3, 2018

(87) PCT Pub. No.: WO2017/126735
PCT Pub. Date: Jul. 27, 2017

(65) Prior Publication Data
US 2020/0310155 A1    Oct. 1, 2020

(30) Foreign Application Priority Data
Jan. 19, 2016   (KR) .......................... 20-2016-0000302

(51) Int. Cl.
*G02C 3/00*     (2006.01)
*G02C 5/14*     (2006.01)

(52) U.S. Cl.
CPC .............. *G02C 3/00* (2013.01); *G02C 5/146* (2013.01)

(58) Field of Classification Search
CPC . G02C 3/003; G02C 5/20; G02C 5/12; G02C 5/14; G02C 9/04
USPC ............................ 351/123, 121, 79, 158, 155
See application file for complete search history.

(56) References Cited

U.S. PATENT DOCUMENTS 3,955,885 A * 5/1976 Aronsohn ................ G02C 3/00
351/155
2010/0283959 A1* 11/2010 Miyashita .............. G02C 5/001
351/123

FOREIGN PATENT DOCUMENTS

| CN | 2155580 Y | 2/1994 |
| JP | H09-033865 A | 2/1997 |
| JP | H10-161068 A | 6/1998 |
| JP | 2003-107414 A | 4/2003 |
| KR | 10-1414726 B1 | 7/2014 |

* cited by examiner

*Primary Examiner* — Hung X Dang
(74) *Attorney, Agent, or Firm* — KORUS Patent, LLC; Seong Il Jeong

(57) ABSTRACT

The present device relates to an eyeglass frame designed to be supported by cheek bones. The eyeglass frame designed to be supported by cheek bones according to the present invention includes: a front part including a pair of lens rims configured such that eyeglass lenses are fitted thereinto and they are connected to each other via a bridge; a temple part including temples configured such that the first sides thereof are connected to both sides of the front part, respectively, and the second sides thereof are worn on the ears of a wearer; front supports installed into the pair of lens rims, respectively, and configured to be seated on cheek bones of the wearer and support the front part; and side supports installed into the temples, respectively, and configured to be seated on the cheek bones of the wearer and support the front part.

2 Claims, 4 Drawing Sheets

EYEGLASS FRAME SUPPORTED BY CHEEK BONES

TECHNICAL FIELD

The present invention relates to an eyeglass frame, and more specifically to an eyeglass frame designed to be supported by cheek bones, which allows the load of the eyeglass frame to be supported by cheek bones, thereby enabling a wearer having a congenitally weak nasal bone and thus having difficulty wearing eyeglasses to conveniently wear eyeglasses.

BACKGROUND ART

Generally, eyeglasses are a simple optical device fabricated for the purpose of vision correction or vision protection. Such eyeglasses include eyeglass lenses and an eyeglass frame.

Eyeglasses for vision correction are divided into short-sighted glasses, long-distance glasses, magnifying glasses, and astigmatic glasses. Eyeglasses for vision protection are protective glasses for preventing visual deterioration when watching TV or a monitor.

The frames of the above-described eyeglasses are made of a metallic material, such as titanium, aluminum, or the like, or a synthetic resin material, and thus have predetermined weights. The weight of each of the eyeglass frames is distributed and supported by nose pads and temple tips.

However, the eyeglass frame in which load is distributed by the eyes and the nasal bone, as described above, is problematic in that the nasal bone is weak, and thus a wearer feels a load on his or her nose, resulting in a case where the nose is sick.

A prior art related to this is disclosed in Korean Utility Model Registration Application Publication No. 20-2012-0002814 (title of the device: Eyeglass Frame; publication date: Apr. 25, 2012).

DISCLOSURE

Technical Problem

The present invention has been conceived to overcome the above-described problems, and an object of the present invention is to provide an eyeglass frame designed to be supported by cheek bones, which can move the load of the eyeglass frame from a nasal bone having relatively low strength to cheek bones, thereby enabling a wearer having a congenitally weak nasal bone or having difficulty wearing eyeglasses for a reason, such as an injury, to wear eyeglasses.

Another object of the present invention is to provide an eyeglass frame designed to be supported by cheek bones, which enables front supports and side supports, which come into contact with the cheek bones of a wearer, to be moved in lateral directions and front-back directions and to be rotated, thereby improving a wearing sensation in accordance with the shape of the cheek bones.

Technical Solution

In order to accomplish the above objects, the present invention provides an eyeglass frame designed to be supported by cheek bones, the eyeglass frame including: a front part including a pair of lens rims configured such that eyeglass lenses are fitted thereinto and they are connected to each other via a bridge; a temple part including temples configured such that the first sides thereof are connected to both sides of the front part, respectively, and the second sides thereof are worn on the ears of a wearer; front supports installed into the pair of lens rims, respectively, and configured to be seated on cheek bones of the wearer and support the front part; and side supports installed into the temples, respectively, and configured to be seated on the cheek bones of the wearer and support the front part.

Furthermore, first grooves are formed in the lens rims; the front supports are coupled into the first grooves via first hinge elements, and are movable along the first grooves; first coupling members configured to be fitted into the first grooves are provided at ends of the first hinge elements; the first coupling members are rotatable in front-back directions and lateral directions in the state of being coupled into the first grooves; second grooves are formed in the temples in longitudinal directions; the side supports are coupled into the second grooves via second hinge elements, and are movable along the second grooves; second coupling members configured to be fitted into the second grooves are provided at ends of the second hinge elements; and the second coupling members are rotatable in front-back directions and lateral directions in the state of being coupled into the second grooves.

Furthermore, the front supports and the side supports are adjusted in length in accordance with the shape of the cheek bones of the wearer.

Advantageous Effects

According to the above-described present invention, an advantageous effect is provided in that the load of the eyeglass frame can be moved from a nasal bone having relatively low strength to cheek bones, thereby enabling a wearer having a congenitally weak nasal bone or having difficulty wearing eyeglasses for a reason, such as an injury, to wear eyeglasses.

Furthermore, an advantageous effect is provided in that the front supports and the side supports, which come into contact with the cheek bones of a wearer, can be moved in lateral directions and front-back directions and can be rotated, thereby improving a wearing sensation in accordance with the shape of the cheek bones.

MODE FOR INVENTION

Figure 1:
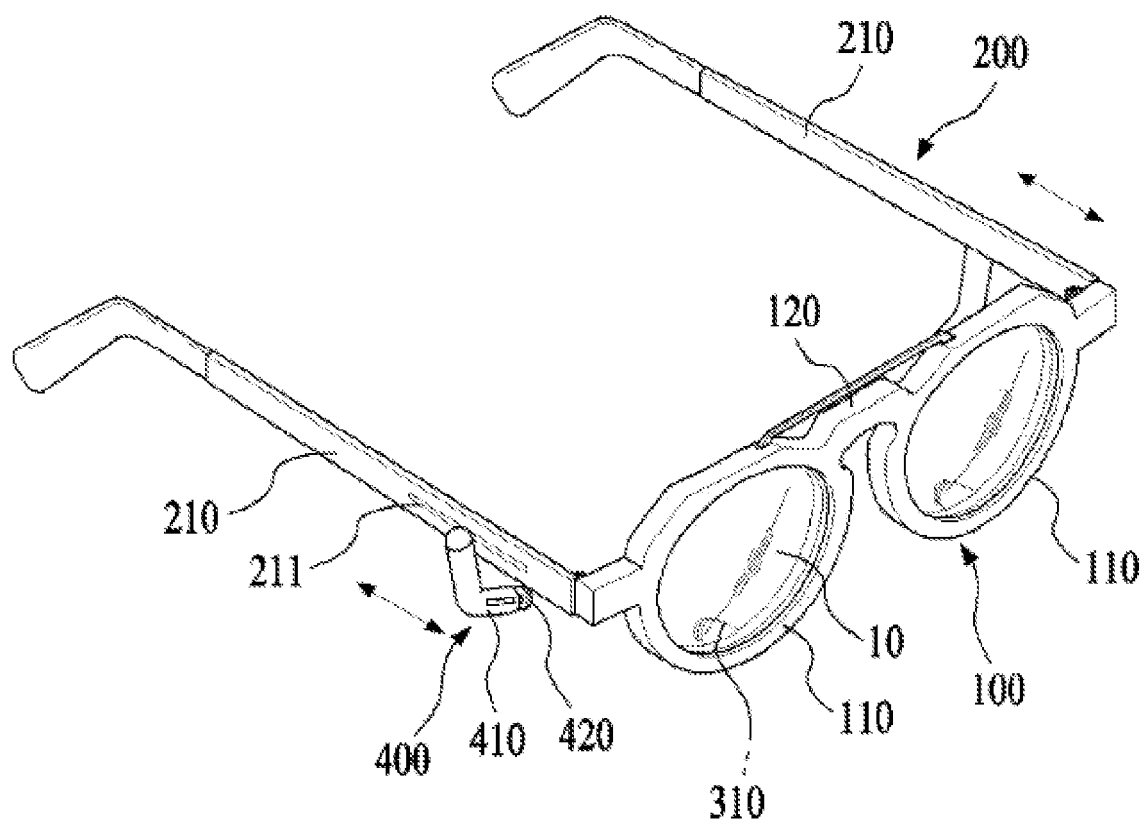
FIG. 1 is a perspective view of an eyeglass frame designed to be supported by cheek bones according to the present invention.

Embodiments of the present invention will be described below with reference to the accompanying drawings. The same reference symbols presented in the drawings designate like members. In the description of the present invention, a detailed description of a related well-known function or component is omitted in order to prevent the gist of the present invention from being made obscure.

Figure 2:
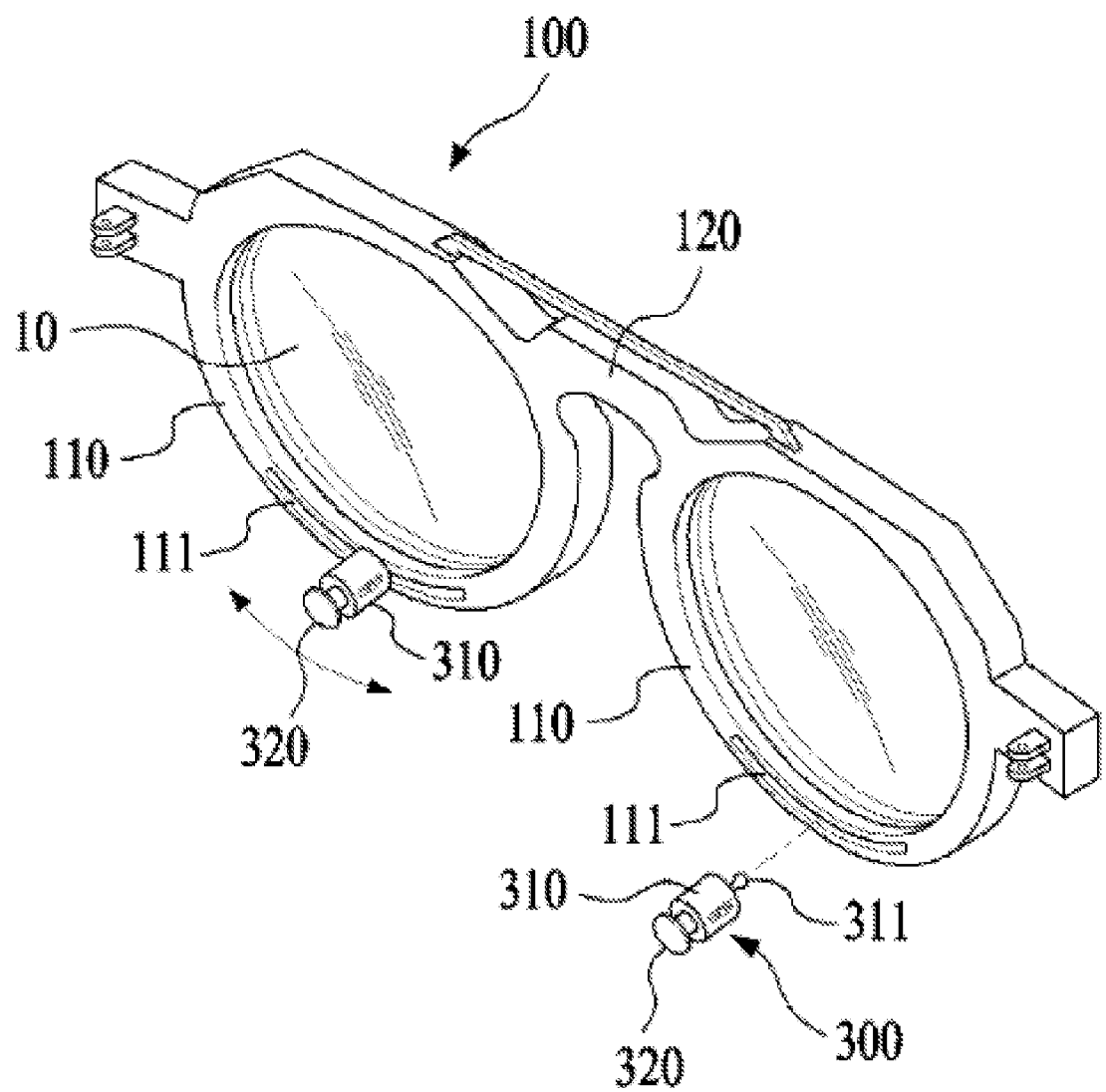
FIG. 2 is a view showing an example of a situation in which the front supports of the eyeglass frame designed to be supported by cheek bones according to the present invention are moved, rotated, and adjusted in length to fit the shape of the cheek bones of a wearer.
Figure 3:
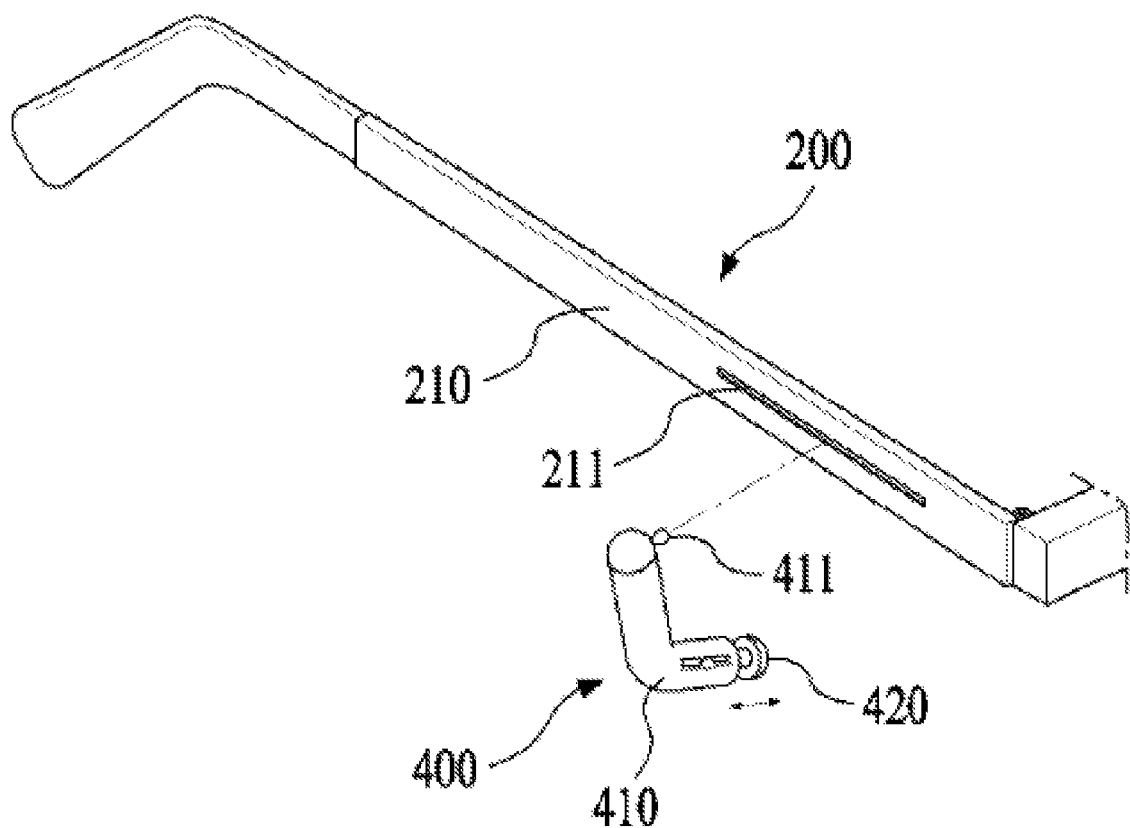
FIG. 3 is a view showing an example of a situation in which the side supports of the eyeglass frame designed to be supported by cheek bones according to the present invention are moved, rotated, and adjusted in length to fit the shape of the cheek bones of a wearer.
Figure 4:
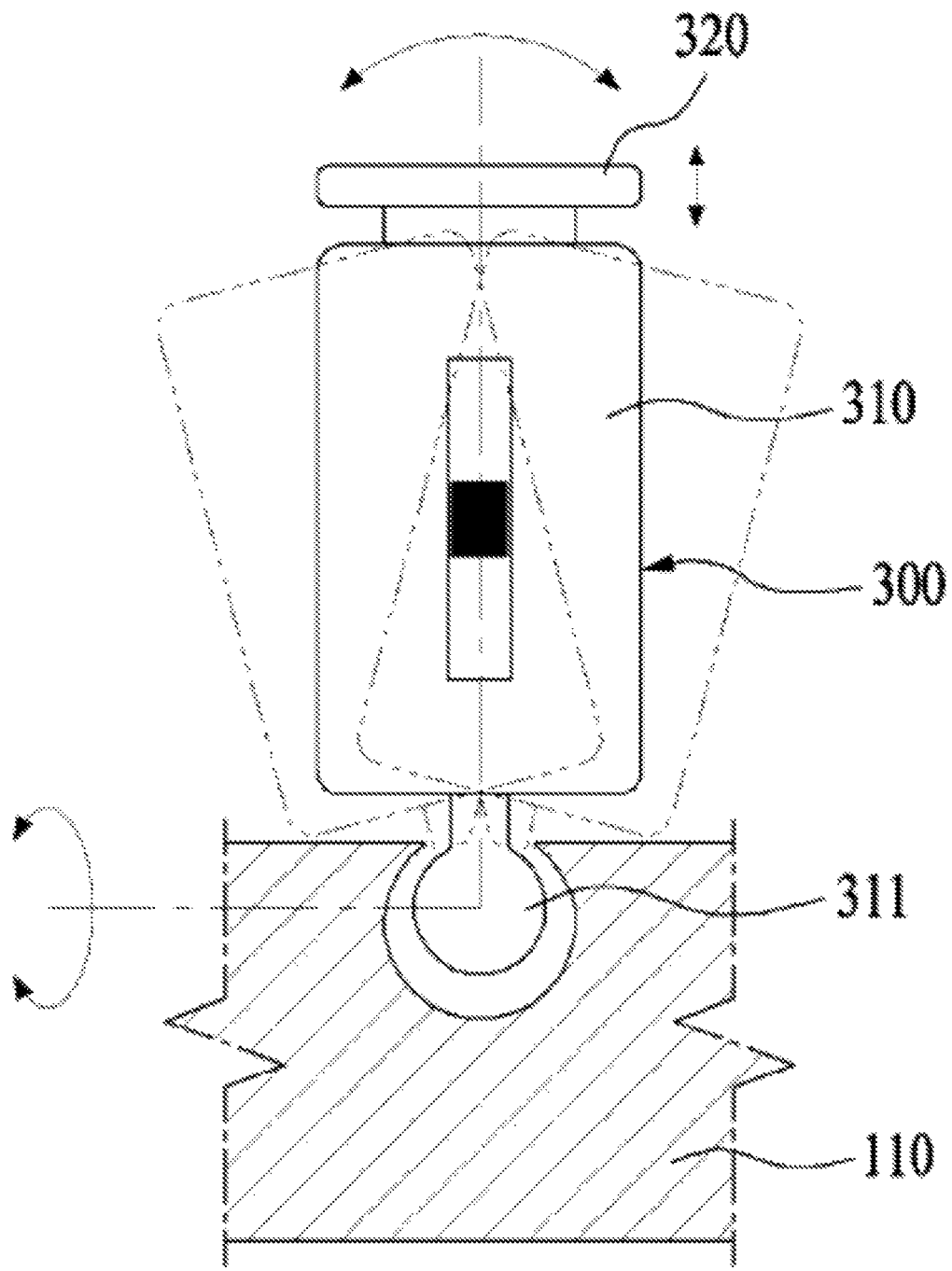
FIG. 4 is a conceptual diagram showing a state in which the front supports of the eyeglass frame designed to be supported by cheek bones according to the present invention have been fitted into lens rims.

FIG. 1 is a perspective view of an eyeglass frame designed to be supported by cheek bones according to the present invention, FIG. 2 is a view showing an example of a situation in which the front supports of the eyeglass frame designed to be supported by cheek bones according to the present invention are moved, rotated, and adjusted in length to fit the shape of the cheek bones of a wearer, FIG. 3 is a view showing an example of a situation in which the side supports of the eyeglass frame designed to be supported by cheek bones according to the present invention are moved, rotated, and adjusted in length to fit the shape of the cheek bones of a wearer, and FIG. 4 is a conceptual diagram showing a state in which the front supports of the eyeglass frame designed to be supported by cheek bones according to the present invention have been fitted into lens rims.

An eyeglass frame designed to be supported by cheek bones according to the present invention includes a front part 100, a temple part 200, front supports 300, and side supports 400.

First, the front part 100 will be described.

As shown in FIGS. 1 and 2, the front part 100 is a member including a pair of lens rims 110. Eyeglass lenses 10 may be fitted into the lens rims 110, respectively.

In other words, each of the lens rims 110 is a type of frame configured to surround the edge of a corresponding one of the eyeglass lenses 10. The lens rims 110 may be made of a synthetic resin material or metallic material.

Furthermore, the pair of lens rims 110 are connected to each other via a bridge 120. The bridge 120 may be located on the middle of the forehead of a wearer when the wearer wears the present invention.

Meanwhile, first grooves 111 are formed in the lens rims 110. A first coupling member 311 provided at an end of each first hinge element 310 to be described later is elastically coupled into a corresponding one of the first grooves 111.

The above-described first coupling member 311 may be laterally moved along the first groove 111 in the state of being inserted into the first groove 111.

As shown in FIG. 4, the above-described first coupling member 311 is preferably fabricated in a spherical shape having an approximately circular section. Accordingly, the first hinge element 310 is freely rotatable in front-back directions and lateral directions in the state of being coupled into the first groove 111.

However, the shape of the above-described first coupling members 311 may vary in various forms, and is not limited thereto.

Next, the temple part 200 will be described.

As shown in FIGS. 1 and 3, the temple part 200 is a member including a pair of temples 210. The first sides of the temples 210 may be rotatably coupled to both sides of the above-described front part 100, respectively, and the second sides thereof may be worn on the ears of a wearer when the wearer wears the present invention.

Although the temples 210 may be made of a lightweight and highly elastic material (e.g., an acrylic material, an Ultem material, or the like) in order to improve a wearing sensation, it may be made of a corrosion-resistant material (e.g., titanium, aluminum, or the like) in order to prevent corrosion attributable to sweat.

Meanwhile, second grooves 211 are formed in the temples 210. A second coupling member 411 provided at an end of each second hinge element 410 to be described later is elastically coupled into a corresponding one of the second grooves 211.

The above-described second coupling member 411 is laterally movable along the second groove 211 in the state of being inserted into the second groove 211.

As shown in FIG. 3, the above-described second coupling member 411 is preferably fabricated in a spherical shape having an approximately circular section. Accordingly, the second hinge element 410 is freely rotatable in front-back directions and lateral directions in the state of being coupled into the first groove 111.

However, the above-described second coupling member 411 may vary in various forms, and is not limited thereto.

Next, the front supports 300 will be described.

As shown in FIGS. 1, 2 and 4, the front supports 300 are a pair of members which are installed into the lens rims 110 and seated on the front portions of the cheek bones of a wearer.

The present invention is characterized in that the first sides of the above-described front supports 300 are installed with the first hinge elements 310 coupled into the first grooves 111 of the lens rims 110 via the first coupling members 311, as shown in FIG. 2, are rotatable in front-back directions, are movable along the lens rims 110 in lateral directions, and are adjustable in length.

The front supports 300 are rotatable, movable, and adjustable in length and, thus, are appropriately adjustable in accordance with the shape of the cheek bones of a wearer, with the result that a wearing sensation can be improved when the eyeglass frame is worn.

Finally, the side supports 400 will be described.

As shown in FIG. 1, the side supports 400 are a pair of members which are installed into the pair of temples 210, respectively, and seated on the sides of the cheek bones of a wearer.

The present invention is further characterized in that the first sides of the above-described side supports 400 are installed with the second hinge elements 410 coupled into the second grooves 211 of the temples 210 via the second coupling members 411, as shown in FIG. 3, are rotatable in front-back directions, are movable along the longitudinal directions of the outer circumferential surfaces of the temples 210 in front-back directions, and are adjustable in length.

The side supports 400 are rotatable, movable and adjustable in length and, thus, are appropriately adjustable in accordance with the shape of the cheek bones of a wearer along with the above-described front supports 300, with the result that a wearing sensation can be improved when the eyeglass frame is worn.

A method of wearing an eyeglass frame designed to be supported by cheek bones according to the present invention, which is configured as described above, will be described.

First, a wearer spreads the pair of temples 210 in order to wear the present invention on a facial portion, and adjusts the locations of the front supports 300 and the side supports 400 by taking into account the shape of the cheek bones of the wearer.

Thereafter, the wearer rotates the front supports 300 and the side supports 400 so that they can be seated on the front portions and side portions of the cheek bones, and simultaneously adjusts the protrusion lengths of the front supports 300 and the side supports 400.

Adjusting the front supports 300 and the side supports 400 before wearing the present invention as described above is referred to as a preliminary adjustment step for the sake of convenience.

When the preliminary adjustment of the front supports 300 and the side supports 400 is completed at the preliminary adjustment step, the wearer wears the present invention on his or her facial portion while holding the temples 210.

Thereafter, when the wearer seats the front supports 300 and the side supports 400 at desired locations on the front portions and side portions of cheek bones by re-adjusting the front supports 300 and the side supports 400 in the state of wearing the present invention, the wearing of the present invention is completed.

The above-described front supports 300 and side supports 400 are preferably made of a soft material, such as rubber, silicon, or the like, in order to prevent a facial skin from being damaged when the present invention is worn.

Furthermore, the lengths of the front supports 300 and the side supports 400 may be adjusted in such a way that, for example, the protrusions 320 and 420 slide and protrude to the outside at ends of the first and second hinge elements 310 and 410 by means of external force, as shown in FIGS. 2 and 3.

The above-described present invention can move the locations, at which the load of eyeglasses is applied, from a nasal bone to cheek bones because the front supports and the side supports seated on the front and side portions of the cheek bones can replace the nose pads of conventional eyeglass frames.

Accordingly, a wearer having a congenital abnormality in his or her nasal bone or a wearer having a damaged nasal bone attributable to an external injury can wear the eyeglasses without any inconvenience.

The optimum embodiments have been disclosed in the drawings and the specification. In this case, although the specific terms have been used, these terms are used merely to describe the present invention, but are not used to limit meanings or the scope of the present invention described in the claims. Accordingly, it can be understood by those having ordinary knowledge in the art that various modifications and other equivalent embodiments can be made from the embodiments. Therefore, the true range of technical protection of the present invention should be defined by the technical spirit of the attached claims.

The invention claimed is:

1. An eyeglass frame designed to be supported by cheek bones, the eyeglass frame comprising:
    a front part including a pair of lens rims configured such that eyeglass lenses are fitted thereinto and they are connected to each other via a bridge;
    a temple part including temples configured such that first sides thereof are connected to both sides of the front part, respectively, and second sides thereof are worn on ears of a wearer;
    front supports installed into the pair of lens rims, respectively, and configured to be seated on cheek bones of the wearer and support the front part; and
    side supports installed into the temples, respectively, and configured to be seated on the cheek bones of the wearer and support the front part, wherein:
    first grooves are formed in the lens rims;
    the front supports are coupled into the first grooves via first hinge elements, and are movable along the first grooves;
    first coupling members configured to be fitted into the first grooves are provided at ends of the first hinge elements;
    the first coupling members are rotatable in front-back directions and lateral directions in a state of being coupled into the first grooves;
    second grooves are formed in the temples in longitudinal directions;
    the side supports are coupled into the second grooves via second hinge elements, and are movable along the second grooves;
    second coupling members configured to be fitted into the second grooves are provided at ends of the second hinge elements; and
    the second coupling members are rotatable in front-back directions and lateral directions in a state of being coupled into the second grooves.

2. The eyeglass frame of claim 1, wherein the front supports and the side supports are adjusted in length in accordance with a shape of the cheek bones of the wearer.

* * * * *